United States Patent [19]
Ward et al.

[11] 4,077,710
[45] Mar. 7, 1978

[54] LENS SHIFT MECHANISM

[75] Inventors: John William Ward, Springwater; Richard Klein Leinbach, Rochester, both of N.Y.

[73] Assignee: Eastman Kodak Company, Rochester, N.Y.

[21] Appl. No.: 654,819

[22] Filed: Feb. 3, 1976

[51] Int. Cl.² .......................................... G03G 15/00
[52] U.S. Cl. .................................. 355/3 R; 355/11; 355/58; 355/66
[58] Field of Search ...................... 355/3 R, 8, 11, 57, 355/58, 65, 66

[56] References Cited

U.S. PATENT DOCUMENTS

| | | | |
|---|---|---|---|
| 3,600,066 | 8/1971 | Del Vecchio | 355/58 X |
| 3,609,036 | 9/1971 | Novak | 355/58 X |
| 3,614,222 | 10/1971 | Post et al. | 355/8 |
| 3,631,786 | 1/1972 | Crapsey | 355/58 X |
| 3,829,209 | 8/1974 | Buddendeck et al. | 355/57 X |
| 3,873,189 | 3/1975 | Whitaker et al. | 355/58 X |

*Primary Examiner*—Fred L. Braun
*Attorney, Agent, or Firm*—Lawrence P. Kessler

[57] ABSTRACT

Apparatus for shifting a lens carriage including a variable magnification pancratic lens assembly having a plurality of relatively movable optical elements. The lens carriage is mounted to move a first lens element to a plurality of discrete positions along a travel path (oblique to the optical axis established at the 1:1 magnification ratio) for maintaining registration of the light image projected by the lens assembly in the image plane when the image-to-object distance is fixed. A second element of the lens assembly is carried by the first element and is longitudinally movable to a plurality of discrete positions relative to the first element. An arm is positioned in the path of movement of the second lens element to engage the second element to effect particular longitudinal movement thereof relative to the first lens element as the carriage is moved. A series of stops interact with the lens elements to establish specific optical relationships therebetween at discrete positions of the second lens element and discrete positions of the first lens element to provide the varying magnifications.

14 Claims, 9 Drawing Figures

LENS SHIFT MECHANISM

BACKGROUND OF THE INVENTION

1. Field of the Invention

This invention relates to a mechanism for shifting a pancratic lens assembly to provide varying magnifications, and more particularly to a mechanism for both positioning a lens assembly and moving the optical elements of the assembly relative to one another to provide a registered and focused image of an illuminated object at varying magnifications when the overall image-to-object distance is constant for all magnifications.

2. Description of the Prior Art

In the art of photocopying, light images of an illuminated object are exposed on a photosensitive target. Depending upon the size of the original object and the ultimate use of the recorded photocopy, a particular photocopier may be required to function over a plurality of magnification ratios. If the object plane and image plane are at a fixed separation distance, in order to provide variable magnifications, the lens assembly of the photocopier must be moved along the optical axis toward or away from the image plane. The light image is maintained in focus at the image plane for the varying positions of the lens assembly by the use of add lenses or multiple focus lens assemblies.

It has for some time been realized that variable magnification capabilities would be desireable in the field of electrophotocopying. Some examples of variable magnification copying apparatus used in electrophotography are U.S. Pat. Nos. 3,765,760; 3,778,147; 3,829,209; and 3,873,189. As may be readily seen from these patents, many different arrangements have been tried to provide efficient structure for a variable magnification electrophotographic copier apparatus. Additionally, U.S. Pat. No. 3,829,209 points out another problem which particularly concerns variable magnification electrophotographic copiers with fixed image-to-object distance; i.e., some compensation mechanism is required to maintain registration of an object point in the image plane at varying magnifications, such as movement of the lens assembly oblique to the optical axis.

SUMMARY OF THE INVENTION

It is the purpose of this invention to provide a variable magnification electrophotographic copier having a simple and efficient mechanism for moving elements of the lens assembly of the copier to provide the different magnifications with a fixed image-to-object distance. Accordingly, the instant apparatus includes a lens carriage having variable magnification pancratic lens assembly with a plurality of relatively movable optical elements. The lens carriage is mounted to move a first lens element to a plurality of discrete positions along a travel path (oblique to the optical axis established at the 1:1 magnification ratio) for maintaining registration of the light image projected by the lens assembly in the image plane. A second element of the lens assembly carried by the first element is longitudinally movable relative to the first element to a plurality of discrete positions. An arm is positioned in the path of movement of the second lens element to engage the second element to effect particular longitudinal movement thereof relative to the first lens element as the carriage is moved. A series of stops interact with the lens elements to establish specific optical relationships therebetween at discrete positions of the second lens element and discrete positions of the first lens element to provide the varying magnifications.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
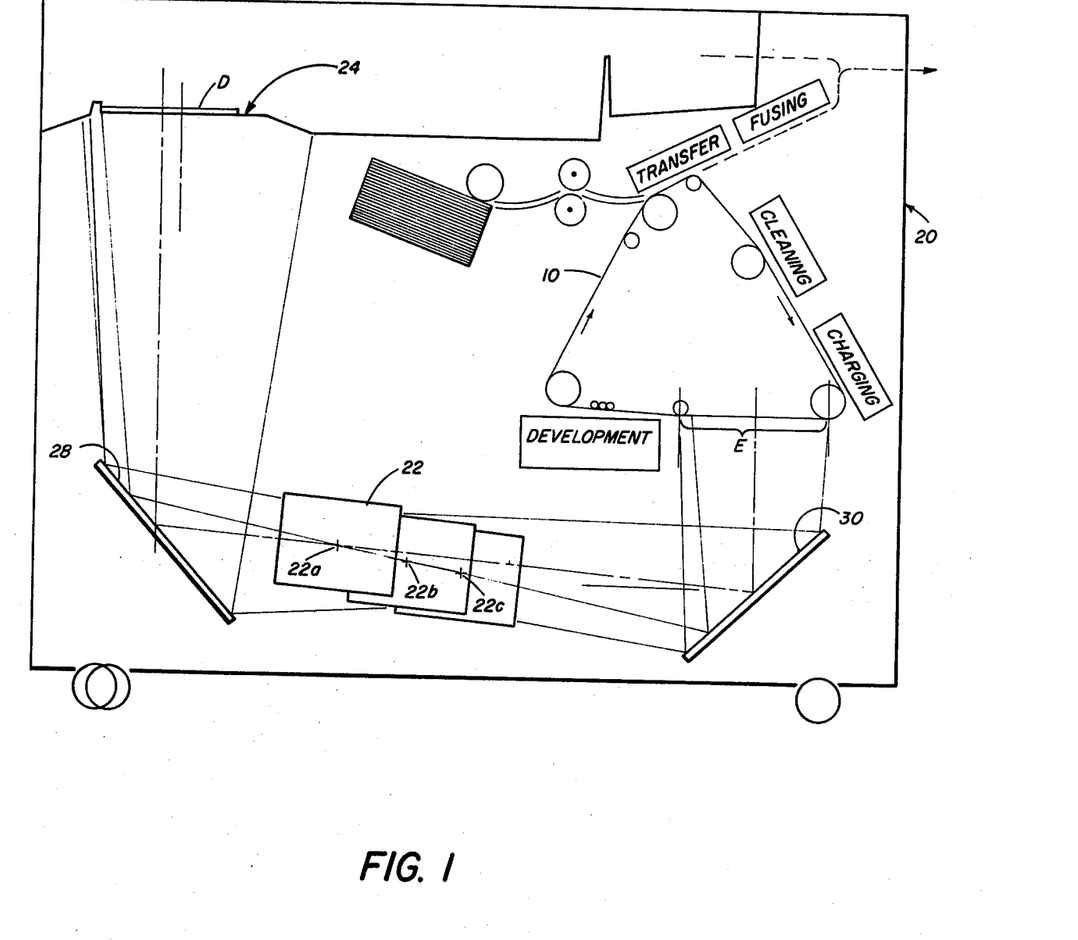
FIG. 1 is a schematic view of an electrophotographic copier incorporating a variable magnification pancratic lens assembly.

Referring now to the drawings, in FIG. 1 a general configuration of an electrophotographic copier is shown, the copier utilizing a moving photoconductive web 10 which passes sequentially through a series of electrophotographic processing stations. A detailed description of such a copier may be found in U.S. Pat. No. 3,914,047 in the name of C. Hunt, Jr., et al issued Oct. 21, 1975. While the instant invention will be described as being embodied in a particular copier, it is understood that it could be used in any environment requiring variable magnifications between an object and its projected image where the object and image are in fixed planes.

Figure 2:
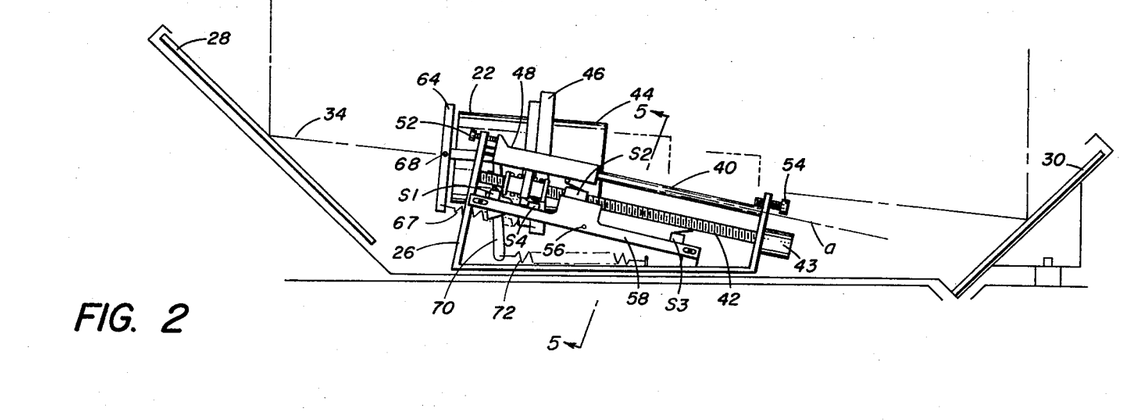
FIG. 2 is a side elevational view of the carriage for the variable magnification pancratic lens assembly according to this invention in the optical path of the copier of FIG. 1.
Figure 4:
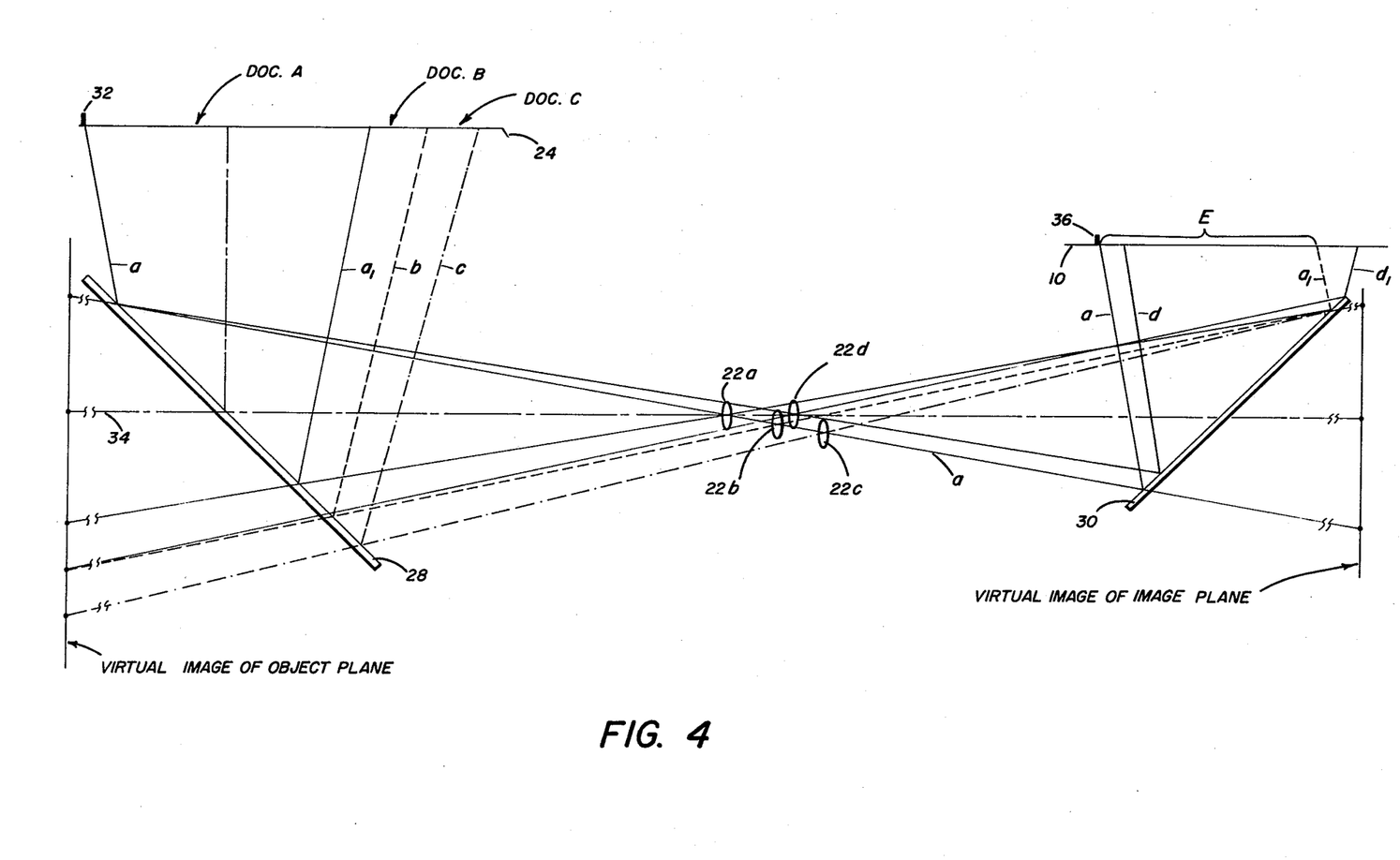
FIG. 4 is a schematic view of the optical path traversed by the lens assembly of this invention showing ray tracings of images projected by the particular lens assembly at various magnification positions.

The optical configuration of the copier includes a carriage 22 (shown schematically in FIG. 1, and more particularly shown in FIGS. 2 and 4) for a pancratic lens assembly, the carriage being movably mounted on a frame 26 fixed to the main frame 20 of the electrophotographic copier. The lens carriage 22 is optically positioned between an object mirror 28 and an image mirror 230, the mirrors also being fixed to the main frame 20. The mirrors are oriented, as shown in FIGS. 1, 2 and 4, such that a document (original to be copied) in the object plane (formed by the copier platen 24) will be imaged in the image plane formed by the segment of the moving photoconductive web 10 in the exposure area E. To establish variable magnifications, the lens carriage 22 is moved in frame 26 toward or away from the image plane to the positions designated 22a, 22b, or 22c.

FIG. 4 additionally illustrates a particular constraint imposed on the movement of the carriage 22 to yield repeatable registration of document images on the web 10. Since a particular position for the image on the web is advantageous for proper registration with a receiver sheet in the transfer processing station (see FIG. 1), it is desirable to place the projected images on the web in the same location relative to the exposure area at all magnifications; for example, one edge of the document should always be projected on the lead edge 36 of the exposure area. The left hand edge of the platen 24 has a registration bar 32 against which all documents are registered to provide the registrable edge of the document. By simple ray tracing, it can be seen that if the carriage 22 moves from its 1:1 magnification ratio position 22a along the optical center line 34 (established at the 1:1 position) to the position 22d, the position of the image (bounded by rays $a-a_1$) will be displayed relative to the 1:1 position (new image bounded by rays $d-d_1$). Therefore, in order to assure proper registration in the exposure area, the carriage 22 must move obliquely to the optical center line 34. The line of movement of the lens carriage necessary to maintain the optical projection of the edge of any document placed against the registration bar 32 to the lead edge 36 of the image on the web 10 is obtained by tracing the ray of the image projected by the edge of the bar 32 to the edge 36; this tracing is coincident with the ray $a$. With the movement of the carriage 22 along ray $a$ to the positions 22b and 22c, the given area of the platen 24 (as for example represented by document B and document C respectively) will be projected to the same exposure area E as is the document A of the 1:1 magnification ratio (position 22a) with the edge of the document resting against bar 32 being imaged at edge 36.

Figure 6:
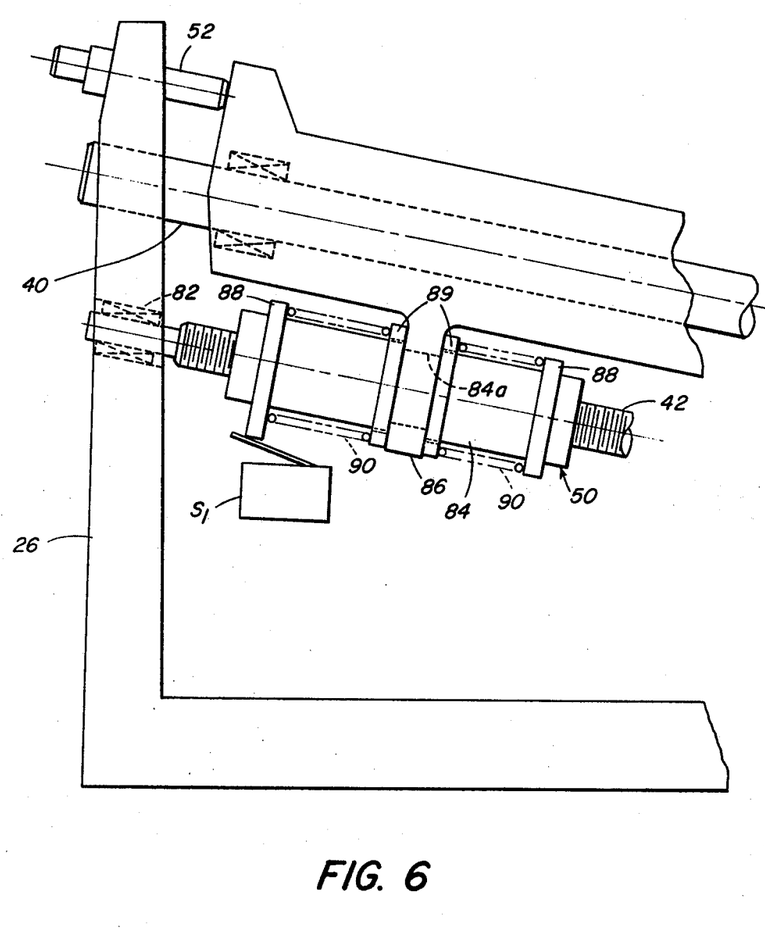
FIG. 6 is an enlarged side elevational view of a portion of the lens assembly of this invention particularly showing the carriage drive mechanism.

In order to establish the path of movement for the lens carriage 22 along the line of the ray $a$, the frame 26 includes a pair of guide rods 40, 41 which are parallel to the ray $a$, and lie in a plane which includes ray $a$, the plane being perpendicular to the vertical plane of the electrophotographic copier through ray $a$, (see FIGS. 2 and 4). A drive screw 42 is supported in bearings 82 carried by the frame 26 (see FIG. 6) and is oriented parallel to the rod 40. The carriage 22 comprises a barrel housing 44 which is fixed to a lens mount 46. A ball bushing 48, which rides on the guide rod 40, and an outboard roller 49, which rides on the guide rod 41 are integrally formed with the lens mount 46. A traveling nut 50 carried by the drive screw 42 is inter-connected with the bushing 48 so that as the drive screw 42 is rotated by a reversible motor 43, the drive nut will move the housing 48 along the rod 40 (and thus parallel to the path of the ray $a$).

The driving connection between the traveling nut 50 and the ball bushing 48 is of the yieldable type (see FIG. 6) in order to take up any overdrive of the motor 43 and to assure repeatability of the positions at which the housing 48 (and thus the lens carriage 22 may be stopped. The nut 50 has an internally threaded body 84 in mating engagement with the drive screw 42. A yoke 86 slidably engages a central hub 84a of body 84 at approximately the midpoint of the body, the yoke 86 being integrally formed with the bushing 48. Washers 88 are fixed to each end of the body 84 and washers 89 are loosely mounted on the body adjacent to central hub 84a. The washers function as retainer sets having a coil spring 90 positioned between a washer 88 and a washer 89 on each side of the hub 84a. Thus, when the lens carriage 22 reaches a stop position, the yoke 86 will be permitted to stop immediately with over-travel of the drive screw 42 being taken up by compression of one of the springs 90. The floating action of the washers 89 maintain both springs 90 in functional engagement with the yoke 86 to provide a positive resilient force on the yoke to prevent backlash upon over-travel.

The drive screw 42 is purposely operated to have a degree of over-travel so that the carriage 22 will always be driven positively into engagement with a limit stop. This will provide repeatability in locating the carriage no matter when the motor 43 stops and the drive screw 42 actually ceases rotation. The frame 26 carries a first adjustable stop 52 at one end and a second adjustable stop 54 at the opposite end which determine the extreme limits of travel of the carriage 22. When the carriage 22 engages the stops 52 and 54, the lens assembly of the carriage will exhibit the desired extreme magnification (for example, particular ratio limits which are selected for the preferred embodiment are 1:1.0 and 1:0.642).

Figure 5:
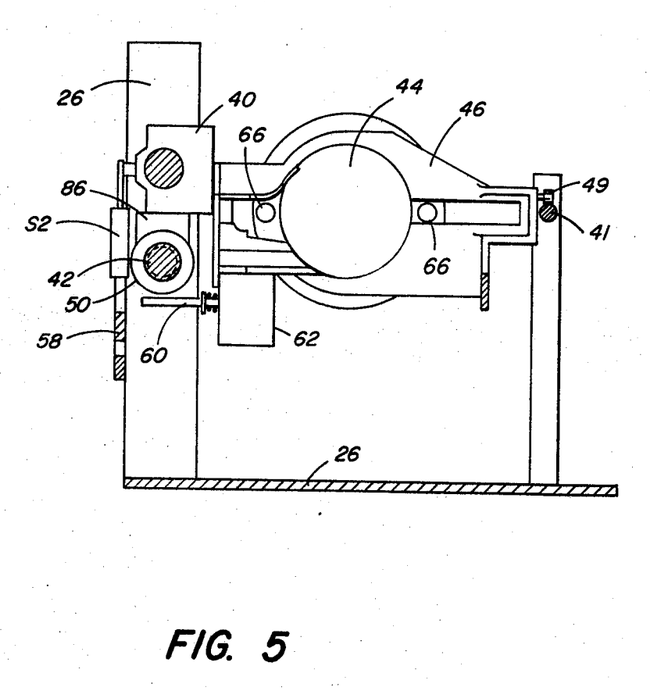
FIG. 5 is a rear elevational view of a portion of the lens assembly taken on lines 5—5 of FIG. 2.

Intermediate positions for the lens carriage 22, for obtaining additional magnifications, are established by providing additional stops between the limit stops 52 and 54. In the preferred embodiment one additional stop, at a magnification ratio of 1:0.767, has been provided. To establish the intermediate stop, an elongated member 58 is connected to the frame 26, the member having a square hole 56 formed therein at a predetermined location. A solenoid 62, which is fixed to the lens mount 46 (see FIG. 5), controls extension of spring loaded pin 60 for engagement with the opening 56. Thus, when the solenoid 62 is selectively deactivated to release the pin 60, the extended pin will seek the opening 56. Due to the location of the opening 56 and the position of the pin 60 relative to the mount 46 of the lens carriage 22, insertion of the pin in the opening will accurately determine the position of the carriage at the desired intermediate position.

The lens assembly of the carriage 22 has a plurality of optical elements which are particularly selected so that the assembly will function as a pancratic lens; i.e., exhibit a plurality of distinct focal lengths while maintaining a constant overall conjugate dimension (image-to-object dimension). The different focal lengths are, of course, chosen to correspond to the desired magnifications. The lens assembly of the carriage 22 includes a first lens element housed within the barrel 44 and a second lens element 64 (front element) carried in a support 65 reciprocably translatable relative to the first element (see FIGS. 2 and 3). By varying the relative positions of the optical elements, the lens assembly will change its overall optical characteristics to establish the different magnifications. The front element support 65 has a pair of guide rods 66 extending therefrom, the rods being slidably supported by the lens mount 46 to permit relative translational movement between the front element 64 and the barrel 44. The extreme limits of the relative positions between the front element 64 and the barrel 44 are set by a forward limit stop 74 and a rear limit stop 76 mounted on one of the rods 66 (see FIG. 3). The limit stops 74, 76 are positioned to engage the lens mount 46 to accurately set the optical elements in specific spatial relationships to yield the desired maximum and minimum magnifications when the carriage 22 is moved to its respective limit positions. The relative positions of the optical elements for intermediate magnifications is determined by annular grooves formed in the rod 66 which are selectively engaged by a spring loaded pin 78, the extension of which is controlled by a solenoid 79 (similar in construction to solenoid 62), fixed to the lens mount 46. (In the preferred embodiment, with one intermediate magnification, one groove 80 is required).

Figure 3:
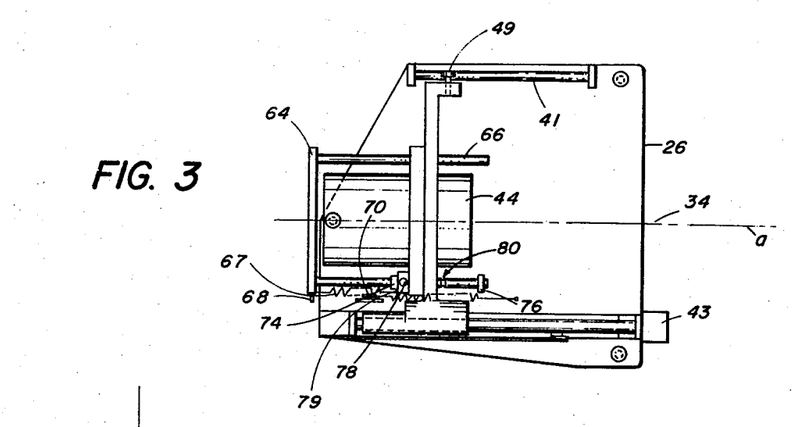
FIG. 3 is a plan view of the lens assembly of FIG. 2.
Figure 7:
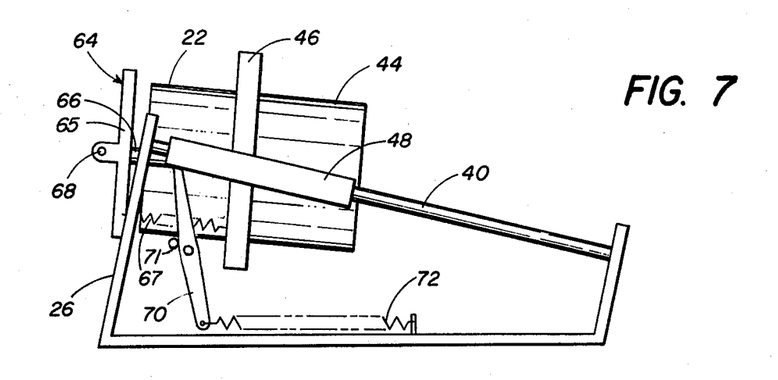
FIGS. 7 through 9 are side elevational views of the carriage for the lens assembly of this invention, with parts removed to facilitate viewing, the individual figures showing the relative discrete positions of lens assembly elements at various magnification positions.

A spring 67, connected between the lens mount 46 and the support 65, constantly urges the support 65 for front element 64 toward a position where the element is fully retracted relative to the barrel 44 into the position shown in FIGS. 2, 3 and 7 (corresponds to the spatial relationship necessary for the 1:1.0 magnification ratio). An arm 70 pivotably mounted on the frame 26 is positioned to intercept the path of travel of a pin 68 extending laterally from the support 65. The arm 70 is biased counterclockwise about its pivot toward the front element 64 by the spring 72 to engage a stop 71 at its maximum counterclockwise position. The spring constant of the spring 72 is greater than that of spring 67 so that when the two are in opposition (when pin 68 engages the arm 70), the spring 72 overcomes the resilient urging of springs 67 and the arm 70 is restrained from pivotal movement. Thus, the front element 64 is moved to the barrel 44 as the barrel moves to the right (see FIG. 9).

Figure 8:
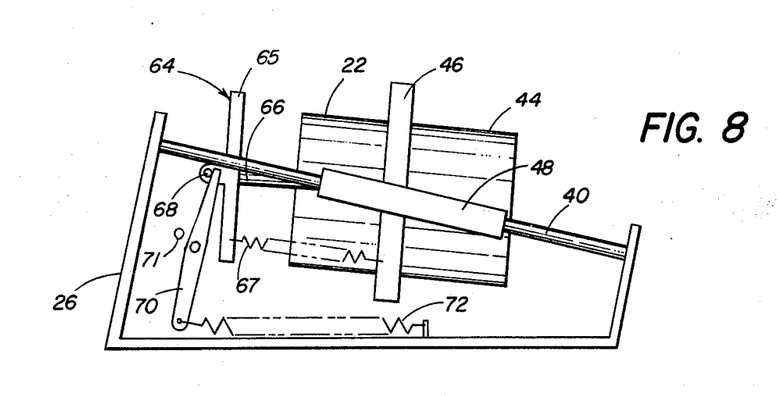

The operation of the described carriage 22 and its pancratic lens assembly will now be described, with the discrete positions of the optical elements at the different magnification ratios being shown in FIGS. 7 through 9. When it is desired to change the magnification of the lens assembly, a signal is sent to the motor 43 to rotate the drive screw 42. To move the lens carriage 22 from the 1:1.0 magnification ratio position shown in FIG. 7, the drive screw 42 rotates clockwise (when viewed from the right) to cause the drive nut 50 to traverse to the right. As the drive nut 50 (through its yieldable coupling with bushing 48) moves the carriage 22 along the travel path coincident with ray $a$, pin 68 of the support 65 will engage arm 70. Because spring constant of spring 72 is greater than that of spring 67, the support 65 will translate relative to the barrel 44 (in actuality the arm 70 and the front element remain stationary relative to frame 26).

If the lens carriage 22 is to be moved to its intermediate position, the above described movement will continue until the bushing 48 no longer contacts switch $S_2$ (see FIG. 2). When the switch $S_2$ is opened a signal will be sent to the solenoids 62 and 79 to release their respective pins (60 and 78). When the pins are released, pin 60 will seek the opening 56 in the member 58 at the intermediate position of the carriage travel and the pin 78 will seek the annular groove 80 on the rod 66. The relative positions of the pins to their recepticles are such that pin 78 will engage the annular groove 80 before pin 60 engages the opening 56. This will insure that the front element 64 and the barrel 44 will assume their fixed relative spatial relationship for intermediate magnification prior to the carriage 22 reaching its intermediate discrete position. This fixed spatial relationship is maintained by virtue of the pin-in-groove connection, which overcomes the bias of the spring 72 and arm 70 on the front element 64, as the carriage 22 continues to move unitl the pin 60 enters the opening 56. The motor 43 is controlled to rotate the shaft 42 (after the opening of switch $S_2$) a specific additional amount necessary to seat the pin 60 against one edge of the opening 56, the over-travel being taken up by the springs 90 of the yieldable coupling between the nut 50 and bushing 48. This provides an accurate and repeatable location for the lens carriage 22 at the intermediate magnification positions (see FIG. 8).

Figure 9:
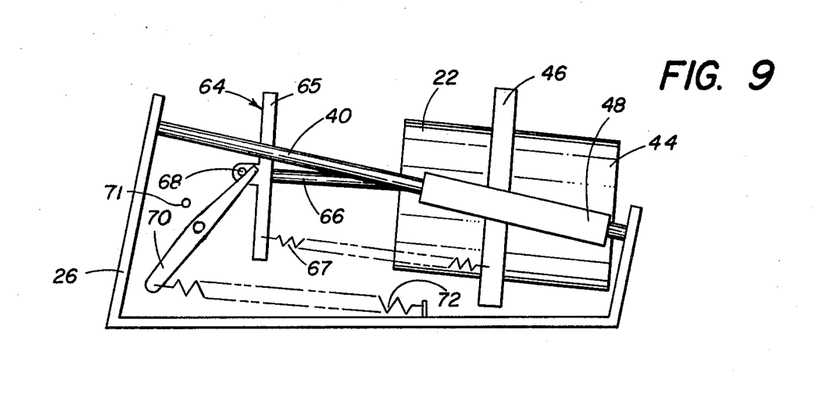

When it is desired to move the lens carriage 22 to the 1:0.642 magnification ratio position, the carriage will move toward the position of FIG. 9 by clockwise rotation of the drive screw 42 and resultant movement of the nut 50 to the right as above. However, the pins 60 and 78 will remain retracted (or will be retracted by the solenoids 62 and 79 if the start position of the lens carriage 22 is the intermediate position of FIG. 8) so that the rods 66 are free to move relative to the lens mount 46 past the intermediate position. With the rods 66 unconstrained in their translational movement, the arm 70 will cause the front element 64 to extend relative to the barrel 44 until the maximum position is reached as set by stop 76. At the time the stop 76 is engaged, the elements will assume a fixed relative optical relationship, with continuing bias on the front element by the arm 70 insuring that such a relationship is maintained. The unitary movement of the elements of the lens assembly continues until the lead edge of the nut 50 contacts switch $S_3$ to close the switch which sends a signal to the motor 43. As noted above the drive screw 42 will be rotated an additional amount, after the switch $S_3$ is closed, to cause enough over-travel of the nut 50 to accurately and repeatably position the lens carriage 22 against the stop 54 (see FIG. 9).

Movement of the carriage lens assembly from the 1:0.642 (or the 1:0.767) magnification ratio position to the 1:1.0 position is accomplished by rotating the screw 42 in the opposite hand (counterclockwise) so that the nut 50 transverses to the left (see FIG. 9). Arm 70 reacting to the bias of spring 72 will maintain the extension of the front element 64 until the lens carriage 22 moves far enough for the arm 70 is rotate about its pivot to its maximum counterclockwise position (see FIG. 7). On continued movement of the carriage, spring 67 will be free to retract the front element until stop 74 engages lens support 46. Subsequent to the lens element reaching their closest relative optical relationship, the lead edge of the nut 50 will contact switch $S_1$ to close the switch which sends a signal to the motor 43. Once again the drive screw 42 will rotate an additional amount to cause enough over-travel to accurately and repeatably position the lens carriage against the stop 52.

When the lens carriage 22 is moved from the 1:0.642 position to the 1:0.767 position, the nut 50 will traverse to the left beyond the intermediate position, until its lead edge contacts the switch $S_4$. During the traverse period, the bushing 48 will contact switch $S_2$ to re-arm the switch. When switch $S_4$ is contacted the switch will be closed to send a signal to the motor 43 so that the motor will be reversed to cause the nut 50 to traverse to the right until the bushing 48 again disengages switch $S_2$ to open the switch. The release of the pins 60 and 78 for setting the relative relationship of the lens elements at the intermediate position will then be accomplished as described above. It should be noted that logic may be provided such that switch $S_4$ may be eliminated. To accomplish this embodiment, when the switch $S_2$ is contacted on movement from the 1:0.642 position, the re-arming of the switch will provide a signal for the logic so that the motor 43 will continue rotating for a given period of time and then will automatically reverse to always approach the mid-position from the same direction. This reversing action (so that the lens carraige always approaches the intermediate position from the same direction) insures that the pin 60 always contacts the same edge of the opening 56 for repeatability of positioning the lens assemby at this position.

From the foregoing it is apparent that there is herein provided a mechanism for shifting a lens carriage to accurately and repeatably establish a plurality of positions of the lens assembly of the carriage for variable magnifications in an apparatus with a fixed image-to-object distance. The lens assembly has a plurality of optical elements which are relatively reciprocally translated to discrete positions as the carriage moves to discrete positions for each magnification. One of the elements is controlled in its movement relative to the other elements to provide different optical relationships to yield the various magnifications at the discrete positions of the lens carriage. The lens carriage moves (oblique to the optical axis established at the 1:1 magnification ratio) to maintain registration of a focused projected image at a particular location in the image plane.

The invention has been described in detail with particular reference to the preferred embodiment thereof, but it will be understood that variations and modifications can be effected within the spirit and scope of the invention.

We claim:

1. An electrophotographic copier apparatus for making document copies at a plurality of magnifications, said apparatus comprising: a platen for supporting a document to be copied; a moving photoconductor for forming electrostatic latent images; and optical means for projecting an image of a document on said platen to an exposure area on said moving photoconductor, said optical means including a carriage supporting a pancratic lens assembly having at least two relatively movable lens elements, means for moving said carriage along a predetermined path to a plurality of discrete positions for establishing different magnifications at the respective discrete positions, means for longitudinally moving one of said lens elements relative to another of said lens elements as said carriage is moved to establish for said lens elements different optical relationships which correspond respectively to the different magnifications; and means effective upon the establishment of a particular optical relationship corresponding to a particular desired magnification for interconnecting said lens elements for unitary movement to disable said longitudinal moving means, whereby location of said carraige in one of its discrete positions provides a desired one of said magnifications.

2. The invention of claim 1 wherein said means for longitudinally moving one of said lens elements includes: means for resiliently urging said one lens element toward said another of said lens elements, an arm pivotably mounted in said apparatus adjacent to said predetermined path for intercepting said one lens element during movement of said carriage, and means responsive to the engagement of said arm with said one lens element during movement of said carriage for overcoming said resilient urging means and moving said one lens element longitudinally relative to said another of said lens elements.

3. In an apparatus for projecting, at any one of several magnifications including a ratio of substantially 1:1, images of an object in an object plane through an optical path to an image plane fixed in spatial relation to said object plane, the apparatus including a carriage movable along a predetermined path to any one of a plurality of discrete positions relative to said object and image planes, a pancratic lens assembly including first lens means fixedly mounted in said carriage, second lens means mounted in said carriage for translational movement relative to said first lens means to any one of a plurality of discrete positions interrelated to the discrete positions of said carriage, to focus an image of an object in the object plane at the image plane at any one of several magnifications, and drive means for selectively moving said carriage and said second lens means to their respective interrelated discrete positions to provide said magnifications, the improvement comprising:

means for resiliently urging said second lens means toward one of its discrete positions in which a first optical relationship between said first lens means and said second lens means is established, whereby location of said carriage in a first one of its discrete positions provides one of said magnifications;

a member movably mounted in said apparatus adjacent to the carriage path for intercepting said second lens means during movement of said carriage;

means responsive to the engagement of said member with said second lens means, during movement of said carriage, for overcoming said resilient urging means and moving said second lens means to a second one of its discrete positions relative to said first lens means, to establish a second optical relationship therebetween; and means effective upon establishment of said second optical relationship for interconnecting said second lens means and said carriage for unitary movement to disable said overcoming means, whereby location of said carriage in said second one of its discrete positions provides another of said magnifications.

4. The invention of claim 3 wherein said predetermined path is related to an axis established by the optical centerline of the 1:1 magnification ratio so as to have a component of movement in the direction of said axis and a component of movement oblique to said axis.

5. The invention of claim 3 wherein said member is an arm pivotally mounted in said apparatus, and wherein said means for overcoming said resilient urging means includes a first spring coupled to said arm for urging said arm in a direction opposed to the urging force of said resilient urging means on said second lens means, said first spring being stronger than said resilient urging means.

6. The invention of claim 5 wherein said resilient urging means includes a second spring coupling said second lens means to said carriage, the spring constant of said first spring being greater than that of said second spring.

7. The invention of claim 3 including at least one elongated guide member for supporting said carriage during movement along said predetermined path by said drive means.

8. The invention of claim 7 wherein said drive means includes:

a drive screw supported in said apparatus for rotation about a rotational axis which is parallel to said predetermined path;

a reversible drive motor coupled to said drive screw for selectively rotating said drive screw in either direction about said rotational axis; and a traveling drive nut coupled to said carriage and threadably received on said drive screw for moving said carriage along said predetermined path in a direction which depends upon the direction of rotation of said drive screw.

9. The invention of claim 8 wherein said traveling drive nut further comprises:

an internally threaded body which is threadably received on said drive screw, a yoke integral with said carriage and overlying said body generally about the midpoint of said body; and means for resiliently coupling said body to said yoke whereby movement of said traveling nut on said drive screw is transmitted to said carriage through said resilient coupling means in order to absorb over-travel of said body.

10. The invention of claim 9 wherein said resilient coupling means includes a first pair of retainers mounted on one end of said body, one retainer of said first pair being fixed to said body and the other retainer loosely supported by said body adjacent to said yoke; a second pair of retainers mounted on the opposite end of said body, one retainer of said second pair being fixed to said body and the other retainer loosely supported by said body adjacent to said yoke; a first compression spring located between said first pair of retainers, and a second compression spring located between said second pair of retainers, whereby a positive resilient force is established by said springs on said yoke.

11. The invention of claim 3 including first means for stopping said carriage at one end of said predetermined path for establishing the first one of said discrete positions of said carriage, second means for stoping said carriage at the opposite end of said predetermined path for establishing said second one of the discrete positions of said carriage, and third means for selectively stopping said carriage at a discrete position intermediate the ends of said predetermined path.

12. The invention of claim 11 wherein said third means includes an elongated member fixed in said apparatus and having at least one opening therein positioned to establish said discrete intermediate position, and a moveable pin carried by said carriage and moveable into engagement with said one opening to stop said carriage at said intermediate position, and selectively actuable solenoid means for moving said pin into said one opening when it is desired to stop said carriage at the intermediate position.

13. The invention of claim 3 wherein said second lens means includes a projection extending therefrom, said projection positioned to be engaged by said member upon movement of said carriage along said predetermined path; and at least one rod extending from said second lens means, said rod being in axially slidable engagement with said carriage.

14. The invention of claim 13 wherein said means for interconnecting said second lens means and said carriage includes: a pair of limit stops located on said rod positioned to define the limits of relative movement between said carriage and second lens means; at least one recess in said rod for determining a discrete position intermediate said limit stops; and a movable pin carried by said carriage and movable into engagement with said one recess to stop said second lens means at said discrete intermediate position and selectively actuable solenoid means for moving said pin into said one recess when it is desired to interconnect said second lens means to said carriage at an intermediate optical relationship.

* * * * *

UNITED STATES PATENT AND TRADEMARK OFFICE
CERTIFICATE OF CORRECTION

PATENT NO. : 4,077,710
DATED : March 7, 1978
INVENTOR(S) : J. W. Ward and R. K. Leinbach It is certified that error appears in the above-identified patent and that said Letters Patent are hereby corrected as shown below:

Col. 2, line 54 - "230" should read --- 30 ---.

Col. 5, line 20 - before "to" (first occurrence) insert --- relative ---.

Claim 1, Col. 7 - delete "to disable said longitudinal moving lines 43 and 44 means".

Claim 2, Col. 7 - after "carriage" insert --- , --- delete line 55 "for";

Claim 2, Col. 7 - delete "and" and insert therefore line 56 --- , for ---.

Claim 3, Col. 8 - delete " , " ;
line 19

Claim 3, Col. 8 - delete "for";
line 20

UNITED STATES PATENT AND TRADEMARK OFFICE
CERTIFICATE OF CORRECTION

PATENT NO. : 4,077,710

DATED : March 7, 1978

INVENTOR(S) : J. W. Ward and R. K. Leinbach

It is certified that error appears in the above-identified patent and that said Letters Patent are hereby corrected as shown below:

Claim 3, Col. 8, line 21 - delete "and" and insert therefore --- , for ---;

Claim 3, Col. 8, line 28 - delete "to disable said overcoming means".

Claim 5, Col. 8, line 39 - delete "overcoming said resilient urging" and insert therefore --- moving said second lens ---.

Claim 14, Col.10, line 20 - after "riage" insert --- for unitary movement ---.

Signed and Sealed this

Eighteenth Day of July 1978

[SEAL]

Attest:

RUTH C. MASON
*Attesting Officer*

DONALD W. BANNER
*Commissioner of Patents and Trademarks*